United States Patent
Yang et al.

(10) Patent No.: US 10,024,498 B2
(45) Date of Patent: Jul. 17, 2018

(54) HYDROGEN STORAGE COMPOSITION, HYDROGEN STORAGE CONTAINER AND METHOD FOR PRODUCING HYDROGEN STORAGE CONTAINER WITH HYDROGEN STORAGE COMPOSITION

(71) Applicant: ASIA PACIFIC FUEL CELL TECHNOLOGIES, LTD., Chunan (TW)

(72) Inventors: Jefferson Y S Yang, Orange, CA (US); Chi-Kai Cheng, Chunan (TW); Wu-Yao Wei, Chunan (TW)

(73) Assignee: ASIA PACIFIC FUEL CELL TECHNOLOGIES, LTD., Chunan (TW)

( * ) Notice: Subject to any disclaimer, the term of this patent is extended or adjusted under 35 U.S.C. 154(b) by 37 days.

(21) Appl. No.: 15/296,647

(22) Filed: Oct. 18, 2016

(65) Prior Publication Data

US 2017/0114959 A1 Apr. 27, 2017

(30) Foreign Application Priority Data

Oct. 21, 2015 (TW) .............................. 104134590 A (51) Int. Cl.
*F17C 11/00* (2006.01)
*B01J 20/28* (2006.01)
(Continued)

(52) U.S. Cl.
CPC ........... *F17C 11/005* (2013.01); *B01J 20/261* (2013.01); *B01J 20/262* (2013.01);
(Continued)

(58) Field of Classification Search
CPC ........ Y02E 60/324; F17C 11/005; F17C 5/00; F17C 2270/01; F17C 2201/0104;
(Continued)

(56) References Cited

U.S. PATENT DOCUMENTS

| 4,161,401 A | 7/1979 | Sandrock |
| 7,708,815 B2 | 5/2010 | Zimmermann |

(Continued)

FOREIGN PATENT DOCUMENTS

| DE | 3150133 | 7/1983 |
| EP | 2110411 | 10/2009 |
| WO | 2015169753 | 11/2015 |

*Primary Examiner* — Colleen P Dunn
*Assistant Examiner* — Syed T Iqbal
(74) *Attorney, Agent, or Firm* — Kirton McConkie; Evan R. Witt (57) ABSTRACT

A hydrogen storage composition, a hydrogen storage container and a method for producing the hydrogen storage container are provided. The hydrogen storage composition includes a thermally-conductive material, a hydrogen storage material, and optionally an elastic material. The hydrogen storage container includes a canister body and the hydrogen storage composition. After the hydrogen storage composition is placed into a canister body, a vacuum environment within the canister body is created, and a first weight of the canister body is recorded. Then, hydrogen gas is activated and charged into the canister body, and a second weight of the canister body is recorded. Then, a hydrogen storage amount is calculated according to the first weight and the second weight. If the hydrogen storage amount reaches the predetermined value, the hydrogen storage container is produced.

12 Claims, 4 Drawing Sheets (51) Int. Cl.
*F17C 5/00* (2006.01)
*B01J 20/26* (2006.01)

(52) U.S. Cl.
CPC ........... *B01J 20/28011* (2013.01); *F17C 5/00* (2013.01); *F17C 2201/0104* (2013.01); *F17C 2221/012* (2013.01); *F17C 2270/01* (2013.01)

(58) Field of Classification Search
CPC ............... F17C 2221/012; B01J 20/262; B01J 20/28011; B01J 20/261; C01B 3/0078
See application file for complete search history.

(56) References Cited

U.S. PATENT DOCUMENTS

| | | | |
|---|---|---|---|
| 8,961,661 B1* | 2/2015 | Vajo | B01J 20/18 502/402 |
| 2006/0081483 A1* | 4/2006 | Chen | B01D 53/02 206/0.7 |
| 2006/0237688 A1* | 10/2006 | Zimmermann | C01B 3/001 252/184 |
| 2013/0140489 A1 | 6/2013 | Zimmermann | |

\* cited by examiner

HYDROGEN STORAGE COMPOSITION, HYDROGEN STORAGE CONTAINER AND METHOD FOR PRODUCING HYDROGEN STORAGE CONTAINER WITH HYDROGEN STORAGE COMPOSITION

FIELD OF THE INVENTION

The present invention relates to a composition and a method for producing a container, and more particularly to a hydrogen storage composition comprising a thermally-conductive material, a hydrogen storage material and an elastic material. The present invention also relates to a hydrogen storage container with the hydrogen storage composition and a method for producing the hydrogen storage container with the hydrogen storage composition.

BACKGROUND OF THE INVENTION

The byproduct of using the hydrogen energy is water. Consequently, the use of the hydrogen energy has many benefits such as high environmental protection and low pollution. Because the hydrogen energy is clean and safe and the use of the hydrogen energy reduces emission of the greenhouse gas and air pollution, the hydrogen energy source is considered as one of the secondary energy sources that replace fossil fuels. Therefore, the development and application of hydrogen energy are highly valued in recent years. However, the technology of storing hydrogen gas (i.e., a hydrogen storing technology) is a challenge to promote and use the hydrogen source.

Nowadays, two methods are widely used to the store hydrogen gas. The first method adopts a high pressure storing technology. For example, after the hydrogen gas is pressurized, the pressurized hydrogen gas is charged into a container (e.g., a steel cylinder) and stored in the container. Alternatively, after the hydrogen gas is liquefied, the liquefied hydrogen is stored in the container. As known, the way of storing the pressurized hydrogen gas or the liquefied hydrogen needs high operating cost and bulky container and has safety problem (e.g., gas leakage).

The second method adopts a low pressure storing technology. For example, the hydrogen gas is adsorbed on a hydrogen storage material through chemical bonding. Since the internal pressure of the hydrogen storage container is lower, this storing method is safer. Moreover, the hydrogen storage density is high and the container is small. Consequently, the manufacturers make efforts in developing the novel hydrogen storage materials. However, as the hydrogen gas is adsorbed by the hydrogen storage material or desorbed from the hydrogen storage material, the volume expansion or shrinkage is at a ratio from 1% to 30%. The volume expansion or shrinkage usually results in stress. The stress results in a strain of the hydrogen storage container (e.g., a hydrogen storage canister). In other words, the durability of the canister body of the hydrogen storage container is deteriorated.

For reducing deformation of the canister body of the hydrogen storage container during the process of charging the hydrogen gas to the hydrogen storage material, some methods were disclosed. For example, in the production process of the hydrogen storage canister, the hydrogen storage material is poured into plural aluminum boxes, then the plural aluminum boxes are stacked on each other, and finally the necking procedure is performed. After the aluminum boxes with the hydrogen storage material are sequentially placed into the canister body, it is necessary to perform two thermally-treating processes on the canister body. Since the process of sequentially placing the aluminum boxes into the canister body and thermally-treating processes are troublesome, time-consuming, labor-intensive, costly and power-consuming, the fabricating cost of the hydrogen storage canister cannot be reduced.

Therefore, the present invention provides a hydrogen storage composition, a hydrogen storage container and a method for producing a hydrogen storage container with the hydrogen storage composition in order to solve the above drawbacks.

SUMMARY OF THE INVENTION

An object of the present invention provides a hydrogen storage composition for alleviating the deformation that is resulted from the volume expansion or shrinkage of the hydrogen storage material. Consequently, the durability and safety of the canister body are enhanced.

Another object of the present invention provides a hydrogen storage container with the hydrogen storage composition of the present invention.

A further object of the present invention provides a method for producing a hydrogen storage container in cost-effective, material-saving, labor-saving and time-saving manners.

In accordance with an aspect of the present invention, there is provided a hydrogen storage composition. The hydrogen storage composition includes a thermally-conductive material, a hydrogen storage material, and optionally an elastic material.

In accordance with another aspect of the present invention, there is provided a hydrogen storage container. The hydrogen storage container includes a canister body and a hydrogen storage composition. The hydrogen storage composition is contained in the canister body. The hydrogen storage composition includes a thermally-conductive material, a hydrogen storage material and optionally an elastic material.

In accordance with a further aspect of the present invention, there is provided a method for producing a hydrogen storage container. The method includes the following steps. In a step (a), a hydrogen storage composition is placed into a canister body. The hydrogen storage composition includes a thermally-conductive material, a hydrogen storage material and optionally an elastic material. In a step (b), a vacuum environment within the canister body is created, and a first weight of the canister body is recorded. In a step (c), hydrogen gas is activated and charged into the canister body, and a second weight of the canister body is recorded. In a step (d), a hydrogen storage amount is calculated according to the first weight and the second weight. If the hydrogen storage amount reaches the predetermined value, the hydrogen storage container is produced. If the hydrogen storage amount does not reach the predetermined value, the steps (b), (c) and (d) are repeatedly done.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a hydrogen storage composition. The hydrogen storage composition is filled in a canister body 30 of a hydrogen storage container 3 (see FIG. 3). In an embodiment, the hydrogen storage composition comprises a thermally-conductive material, a hydrogen storage material and an elastic material. The fraction of the thermally-conductive material is preferably 1 to 15 weight parts, more preferably 1 to 10 weight parts, and the most preferably 1 to 5 weight parts, based on a total of 100 weight parts of the thermally-conductive material, the hydrogen storage material and the elastic material. In case that the fraction of the thermally-conductive material is higher than 1 weight part, the thermally-conductive material can transfer heat to the hydrogen storage material. In case that the fraction of the thermally-conductive material is lower than 30 weight part, the thermally-conductive material can transfer heat to the hydrogen storage material thoroughly in order to effectively heat or cool the hydrogen storage material. Consequently, the efficiency of charging/discharging hydrogen gas is increased. The fraction of the elastic material is preferably 1 to 35 weight parts, more preferably 1 to 20 weight parts, and the most preferably 1 to 10 weight parts, based on a total of 100 weight parts of the thermally-conductive material, the hydrogen storage material and the elastic material. In case that the fraction of the elastic material is higher than 1 weight part, the elastic material can alleviate the strain or deformation that is resulted from the volume expansion or shrinkage of the hydrogen storage material. In case that the fraction of the elastic material is lower than 35 weight part, the fraction of the hydrogen storage material is at least 50 weight parts in order to increase the hydrogen storage amount of the hydrogen storage container.

It is noted that the proportions of the components of the hydrogen storage composition may be varied according to the practical requirements. For example, the elastic component is optionally omitted. Under this circumstance, the fraction of the thermally-conductive material is preferably 1 to 30 weight parts, more preferably 1 to 20 weight parts, and the most preferably 1 to 10 weight parts, based on a total of 100 weight parts of the thermally-conductive material and the hydrogen storage material. In case that the fraction of the thermally-conductive material is higher than 1 weight part, the thermally-conductive material can transfer heat to the hydrogen storage material. In case that the fraction of the thermally-conductive material is lower than 30 weight part, the thermally-conductive material can transfer heat to the hydrogen storage material thoroughly in order to effectively heat or cool the hydrogen storage material. Consequently, the efficiency of charging/discharging hydrogen gas is increased.

Figure 3:
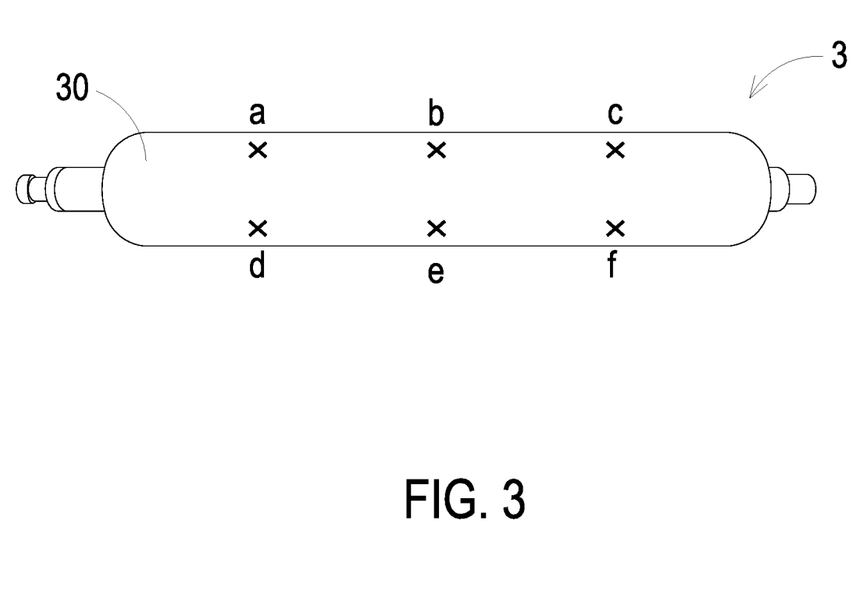
FIG. 3 schematically illustrates some positions of measuring the deformation of the hydrogen storage container according to an embodiment of the present invention.

The cross section of the canister body 30 has a circular shape, an elliptic shape, a triangular shape, a square shape, a polygonal shape or an irregular shape. It is noted that the shape of the cross section of the canister body 30 is not restricted. In an embodiment, the canister body 30 is a cylinder-shaped canister body. Preferably but not exclusively, the hydrogen storage container 3 is made of a metallic material (e.g., steel or aluminum alloy) or a carbon fiber-reinforced composite material. Moreover, the container 3 is a gas storage canister or a hydrogen storage canister. The hydrogen storage container 3 is suitably used as a hydrogen gas source. Moreover, the hydrogen storage container 3 is applied to any electronic device using fuel cells. An example of the electronic device includes but is not limited to a mobile electric vehicle, a stationary power generator or a 3C product. The hydrogen storage container 3 has an accommodation space for accommodating the hydrogen storage composition and storing the hydrogen gas.

An example of the thermally-conductive material includes but is not limited to carbon, copper, titanium, zinc, iron, vanadium, chromium, manganese, cobalt, nickel or aluminum, an alloy wire, a fiber yarn, a needle-type structure or a powdery structure of the above components, or any other appropriate thermally-conductive material with thermal conductivity in the range between 90 and 500 W/mk. Due to the thermal conductivity of the alloy wire, the fiber yarn, the needle-type structure or the powdery structure, the surface area of the thermally-conductive material is effectively increased and the thermal conduction efficacy of the hydrogen storage material is enhanced.

The hydrogen storage material is a hydrogen storage alloy or a hydrogen storage nanomaterial. The hydrogen storage material can absorb or desorb hydrogen gas at different operating temperatures and pressures in order to achieve the purpose of storing or releasing the hydrogen gas. In an embodiment, the hydrogen storage material includes an AB alloy, an A2B alloy, an AB2 alloy, an AB5 alloy or a body-centered cubic (BCC) alloy. In the AB5 alloy, A is lanthanum (La) alone or the mixture of at least one rare earth element and lanthanum. Particularly, lanthanum (La) or a portion of lanthanum (La) is substituted by cerium (Ce), praseodymium (Pr), neodymium (Nd) or other rare-earth element. For example, A is a cerium-rich alloy (Mm). Moreover, B is iron (Fe), nickel (Ni), manganese (Mn), cobalt (Co) or aluminum (Al). In the AB2 alloy, A is titanium (Ti) or zirconium (Zr), B is manganese (Mn), chromium (Cr), vanadium (V) or iron (Fe), and the ratio of A to B is in the range between 1:1 and 1:2 (e.g., 1:2). For example, the AB alloy includes titanium-iron (TiFe) alloy or titanium-cobalt (TiCo) alloy, wherein the B component can be partially substituted by a variety of elements. For example, the A2B is magnesium-nickel alloy (Mg2Ni). The BCC alloy is a body-centered cubic alloy consisting of titanium (Ti), chromium (Cr), vanadium (V), molybdenum (Mo) and the like. Preferably, the hydrogen storage material includes but is not limited to lanthanum-nickel alloy series, iron-titanium alloy series or magnesium-nickel alloy series. In addition, the carbon nanomaterial is also suitably used as the hydrogen storage material.

An example of the elastic material includes but is not limited to elastic resin, or a solid polymeric material selected from the group consisting of Polyurethanes (PU), Rubbers, Elastomers, Polyvinyl chloride (PVC), Acrylonitrile-butadiene-styrene copolymer (ABS copolymer), High density polyethylene (HDPE), Low density polyethylene (LDPE), Polystyrene (PS), Polycarbonate (PC), Poly(methyl methacrylate) (PMMA), Thermoplastic elastomer (TPE) and Polypropylene (PP). Preferably, the elastic material is polyurethane (PU). The elastic material is used for alleviating the deformation of the hydrogen storage material from volume expansion or shrinkage. More preferably, the granular elastic material (e.g., PU granule) is used as the elastic material. It is noted that the elastic material is not limited to the above-mentioned materials. Preferably, the elastic material includes a solid polymeric material having a plastic deformation rate higher than or equal to the deformation rate of the hydrogen storage material. Consequently, the elastic material can alleviate the strain or deformation that is resulted from the volume expansion or shrinkage of the hydrogen storage material.

Figure 1:
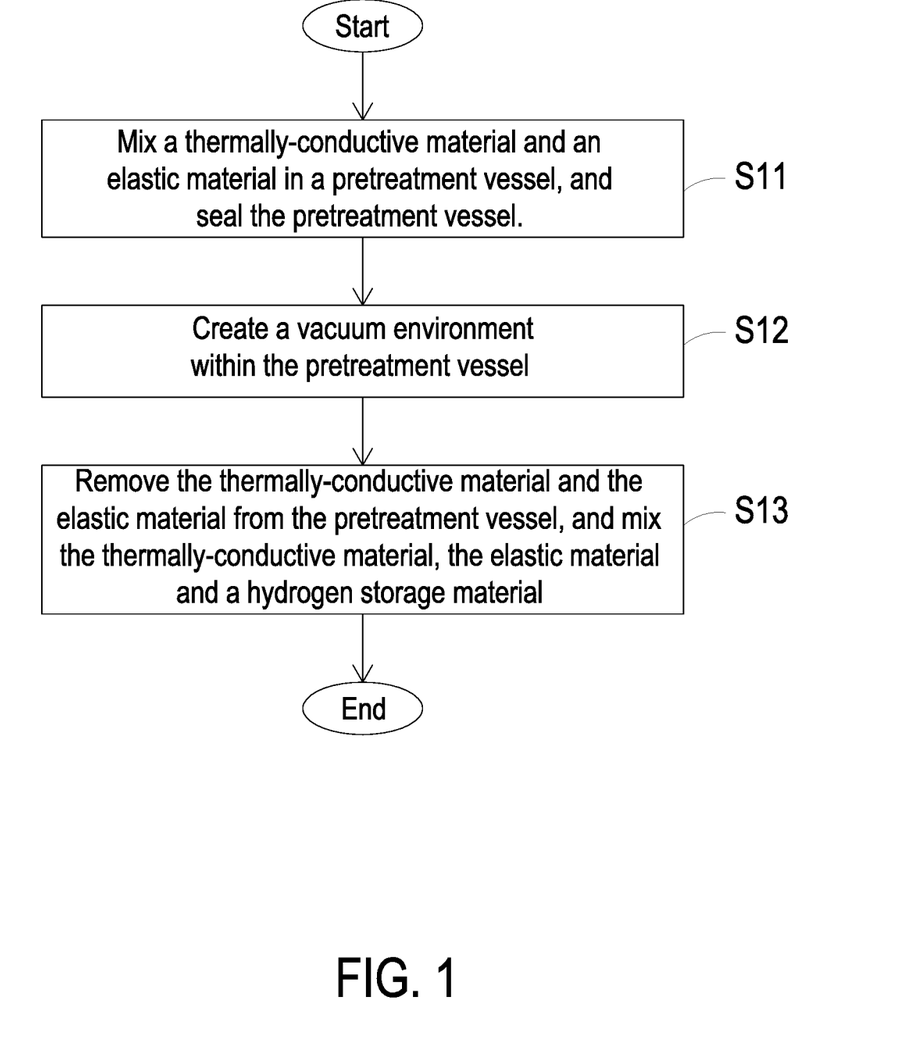
FIG. 1 is a flowchart illustrating a process of forming and pretreating a hydrogen storage composition according to an embodiment of the present invention.

FIG. 1 is a flowchart illustrating a process of forming and pretreating a hydrogen storage composition according to an embodiment of the present invention. In a step S11, a thermally-conductive material and an elastic material are mixed and placed into a pretreatment vessel (not shown), and then the pretreatment vessel is sealed. Consequently, the pretreatment vessel is in an airtight state. Then, in a step S12, a vacuum environment within the pretreatment vessel is created. For example, after the pretreatment vessel with the thermally-conductive material and the elastic material is placed in a constant temperature water tank and maintained at a constant temperature, a vacuum pump (not shown) is turned on to create the vacuum environment within the pretreatment vessel. Preferably but not exclusively, the constant temperature water tank is maintained at 60° C. or higher, and the vacuum pump is operated for at least one hour to create the vacuum environment within the pretreatment vessel. In a step S13, the thermally-conductive material and the elastic material are removed from the pretreatment vessel and mixed with a hydrogen storage material, and the thermally-conductive material, the elastic material and the hydrogen storage material are stirred for a specified time period (e.g., the stirring time includes but is not limited to 5 minutes) and uniformly mixed. Consequently, the process of forming and pretreating the hydrogen storage composition is completed.

Figure 2:
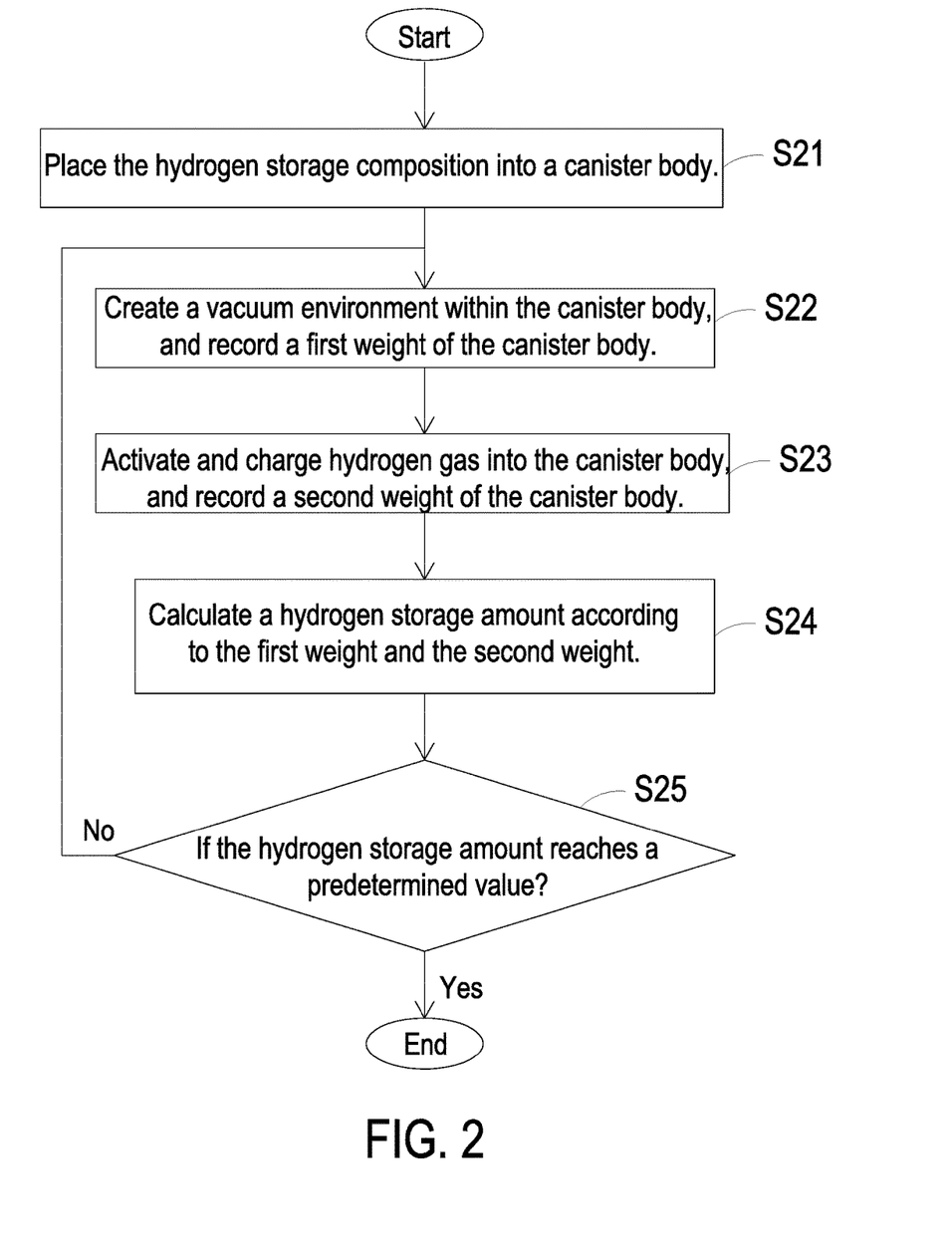
FIG. 2 is a flowchart illustrating a method for producing a hydrogen storage container according to an embodiment of the present invention.

FIG. 2 is a flowchart illustrating a method for producing a hydrogen storage container according to an embodiment of the present invention. FIG. 3 schematically illustrates some positions of measuring the deformation of the hydrogen storage container according to an embodiment of the present invention. Firstly, in a step S21, the hydrogen storage composition is placed into a canister body 30. In an embodiment, the hydrogen storage composition comprises a thermally-conductive material, a hydrogen storage material and an elastic material in a specified weight ratio. The fraction of the thermally-conductive material is preferably 1 to 15 weight parts, and the fraction of the elastic material is preferably 1 to 35 weight parts, based on a total of 100 weight parts of the thermally-conductive material, the hydrogen storage material and the elastic material. In another embodiment, the hydrogen storage composition comprises a thermally-conductive material and a hydrogen storage material. The fraction of the thermally-conductive material is 1 to 30 weight parts, based on a total of 100 weight parts of the thermally-conductive material and the hydrogen storage material. Optionally, the step S21 further comprises a sub-step of pretreating the hydrogen storage composition. The way of pretreating the hydrogen storage composition is similar to the flowchart of FIG. 1. That is, after the thermally-conductive material and the elastic material are mixed in the pretreatment vessel, a vacuum environment within the pretreatment vessel is created. Then, the hydrogen storage material is added and uniformed mixed with the thermally-conductive material and the elastic material, and thus the hydrogen storage composition is formed. After the hydrogen storage composition is formed and placed into a canister body 30, the canister body 30 is sealed. Consequently, the canister body 30 is in an airtight state.

Then, in a step S22, a vacuum environment within the canister body 30 is created, and the weight of the canister body 30 is recorded. The weight of the canister body 30 indicates the weight of the canister body 30 before the canister body 30 is charged with hydrogen gas. In an embodiment of the step S22, after the canister body 30 is in the airtight state, the canister body 30 is placed in a constant temperature water tank and maintained at a constant temperature, and a vacuum pump (not shown) is turned on to create the vacuum environment within the canister body 30. Preferably but not exclusively, the constant temperature water tank is maintained at 60° C. or higher.

Then, in a step S23, hydrogen gas is activated and charged into the canister body 30, and the weight of the canister body 30 is recorded. The weight of the canister body 30 indicates the weight of the canister body 30 after the canister body 30 is charged with hydrogen gas. In an embodiment, for activating and charging hydrogen gas into the canister body 30, the canister body 30 is placed in a hydrogen supply system with cold water circulation (5~20° C.) and pure hydrogen gas is charged into the canister body 30 at a pressure of 1 MPa for at least one hour. The process of activating and charging hydrogen gas into the canister body may be varied according to the practical requirements.

Then, in a step S24, a hydrogen storage amount is calculated according to the result of comparing the weight of the canister body 30 before charged with hydrogen gas and the weight of the canister body 30 after charged with hydrogen gas. Then, a step S25 is performed to judge whether the hydrogen storage amount reaches a predetermined value. If the judging condition of the step S25 is satisfied, it means that the hydrogen storage container is produced. Whereas, if the judging condition of the step S25 is not satisfied, the above steps are repeatedly done until the hydrogen storage amount reaches the predetermined value.

The present invention will be further understood in more details with reference to the following examples.

Four formulations of the hydrogen storage compositions are prepared by mixing different amounts of thermally-conductive material (e.g., aluminum fiber), a fixed amount of elastic material (e.g., PU granule) and a fixed amount of hydrogen storage material. After 50 grams of thermally-conductive material, 70 grams of elastic material and 3000 grams of hydrogen storage material are mixed, a formulation A is prepared. After 100 grams of thermally-conductive material, 70 grams of elastic material and 3000 grams of hydrogen storage material are mixed, a formulation B is prepared. After 150 grams of thermally-conductive material, 70 grams of elastic material and 3000 grams of hydrogen storage material are mixed, a formulation C is prepared. After 200 grams of thermally-conductive material, 70 grams of elastic material and 3000 grams of hydrogen storage material are mixed, a formulation D is prepared. Then, the hydrogen storage compositions with the formulations A, B, C and D are placed into four different canister bodies 30, respectively. After the subsequent hydrogen activating process and measuring process, four hydrogen storage containers 3 are produced. In addition, some experimental data are acquired for comparison.

Pretreatment of Hydrogen Storage Composition

Firstly, 50 grams of thermally-conductive material and 70 grams of elastic material are mixed and placed into a pretreatment vessel. Then, the pretreatment vessel is sealed, and thus the pretreatment vessel is in an airtight state. Then, the pretreatment vessel is placed in a constant temperature water tank and maintained at 60° C. or higher. Then, a vacuum pump is turned on for at least one hour in order to create a vacuum environment within the pretreatment vessel. Then, the thermally-conductive material and the elastic material are removed from the pretreatment vessel and poured into a stirring device. Then, 3000 grams of hydrogen storage material is poured into the stirring device. The stirring device is operated for at least 5 minutes to uniformly mix these components. Meanwhile, the process of forming and pretreating the hydrogen storage composition is completed. Meanwhile, the formulation A is produced.

The processes of producing the formulations B, C and D are similar to the process of producing the formulation A except for the weight of the thermally-conductive material. The processes of pretreating the hydrogen storage compositions containing the formulations B, C and D are similar to the process of pretreating the hydrogen storage composition containing the formulation A.

Production of Hydrogen Storage Container and Hydrogen Activation

The canister body of the hydrogen storage container is a cylindrical canister body with the following dimensions. For example, the length is 297 mm, the diameter is 76.2 mm, and the wall thickness 2.0 mm. Moreover, the designed pressure is 3.2 MPa.

Firstly, a canister body 30 is provided. The canister body 30 is sealed and contains at least one gas conducting element (e.g., a through-hole or a gas-penetrative pipe). Then, the formulation A after pretreatment is placed into the canister body 30. Then, the airtight canister body 30 is placed in a constant temperature water tank and maintained at 60° C. or higher. Then, a vacuum pump is turned on to create a vacuum environment within the canister body 30, and the weight of the canister body 30 is recorded. The weight of the canister body 30 indicates the weight of the canister body 30 before the canister body 30 is charged with hydrogen gas. Then, the canister body 30 is placed in a hydrogen supply system with cold water circulation (5~20° C.) and pure hydrogen gas is charged into the canister body 30 at a pressure of 1 MPa for at least one hour. Consequently, hydrogen gas is activated and charged into the canister body 30. The weight of the canister body 30 is recorded. The weight of the canister body 30 indicates the weight of the canister body 30 after the canister body 30 is charged with hydrogen gas. Then, a hydrogen storage amount is calculated according to the result of comparing the weight of the canister body 30 before charged with hydrogen gas and the weight of the canister body 30 after charged with hydrogen gas. If the hydrogen storage amount reaches the predetermined value, the hydrogen storage container 3 is produced. If the hydrogen storage amount does not reach the predetermined value, the above processes are repeatedly done until the hydrogen storage amount reaches the predetermined value.

The components of the formulations B, C and D are similar to the components of the formulation A except for the weight of the thermally-conductive material (e.g., aluminum fiber). The processes of producing the hydrogen storage container 3 containing the formulations B, C and D is similar to the process of producing the hydrogen storage container 3 containing the formulation A, and are not redundantly described herein.

Results of Experiment

As mentioned above, the four formulations A, B, C and D are prepared by mixing different amounts of thermally-conductive material (e.g., aluminum fiber), a fixed amount of elastic material (e.g., PU granule) and a fixed amount of hydrogen storage material. The hydrogen storage amounts of the hydrogen storage containers containing different formulations are listed in Table 1.

TABLE 1

| Formulation | Weight(g) before charged with hydrogen | Weight(g) after charged with hydrogen | hydrogen storage amount (g) |
|---|---|---|---|
| A | 3791.68 | 3839.78 | 45.37 |
| B | 3840.39 | 3888.51 | 45.39 |
| C | 3873.72 | 3922.92 | 46.41 |
| D | 3952.87 | 4002.06 | 46.35 |

Please refer to Table 1. As the fraction of the thermally-conductive material increases, the hydrogen storage amount gradually increases. Moreover, in each formulation, the weight percentage of the hydrogen storage amount of the hydrogen storage material (i.e., the hydrogen storage amount of the hydrogen storage container) with respect to the hydrogen storage material is about 1.5%.

FIG. 3 schematically illustrates some positions of measuring the deformation of the hydrogen storage container according to an embodiment of the present invention. For example, the deformation values at the positions a, b, c, d, e and f of the canister body 30 are measured. The measuring results are listed in Table 2.

TABLE 2

| | | Formula | | | | | | | |
|---|---|---|---|---|---|---|---|---|---|
| | | A | | B | | C | | D | |
| | | Before/after charged with hydrogen | | | | | | | |
| | | Before | After | Before | After | Before | After | Before | After |
| Deformation measured at different positions (mm) | a | 76.35 | 76.38 | 76.1 | 76.1 | 76.2 | 76.2 | 76.1 | 76 |
| | b | 76.1 | 76.38 | 76 | 76 | 75.9 | 75.8 | 76.1 | 75.95 |
| | c | 76.32 | 76.28 | 76.05 | 76 | 75.95 | 75.9 | 76.15 | 76 |
| | d | 76.3 | 76.28 | 76.2 | 76.25 | 76.25 | 76.25 | 75.85 | 76 |
| | e | 76.32 | 76.42 | 76.3 | 76.3 | 76.25 | 76.25 | 75.8 | 76.05 |
| | f | 76.18 | 76.24 | 76.25 | 76.25 | 76.1 | 76.15 | 75.8 | 76.05 |

Please refer to Table 2 again. In the hydrogen storage container 3 containing the formulation A, B, C or D, the deformation values measured at different positions before charged with hydrogen gas and after charged with hydrogen gas are very small. In other words, the addition of the elastic material can alleviate the deformation (or strain) that is resulted from the volume expansion or shrinkage of the hydrogen storage material. Since the deformation of the canister body 30 is reduced, the durability and safety of the canister body 30 are enhanced.

Figure 4:
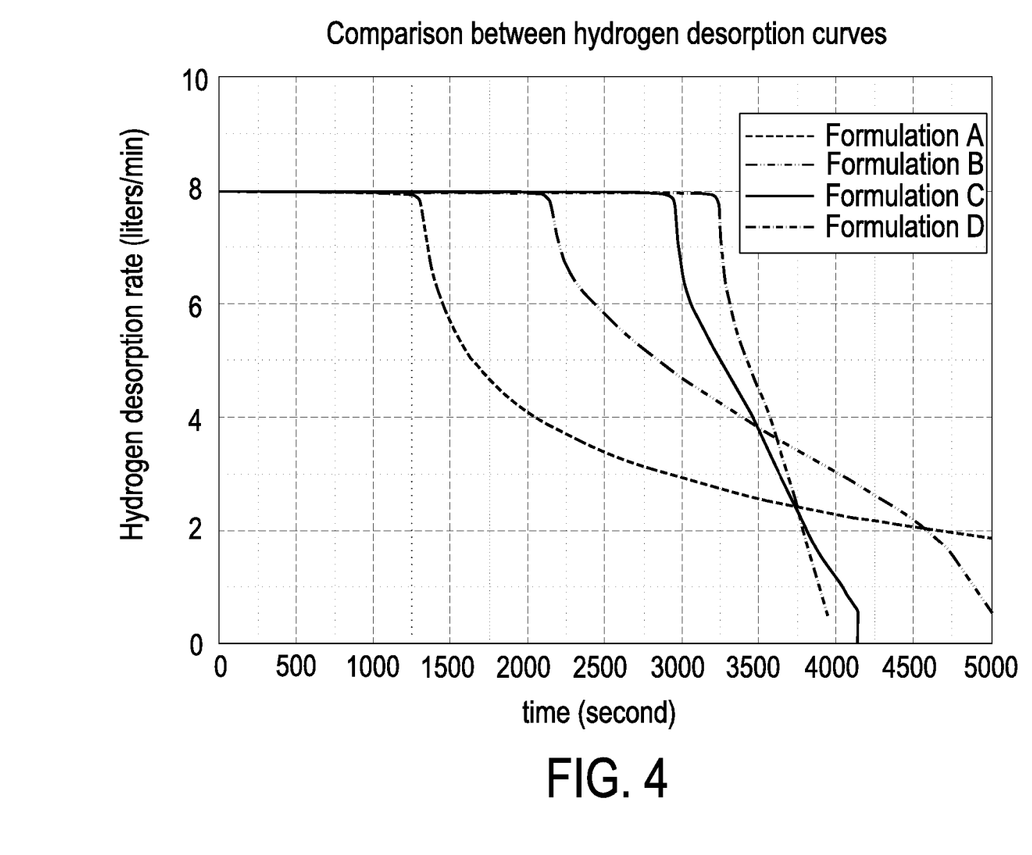
FIG. 4 is a plot illustrating the hydrogen desorption curves of four hydrogen storage compositions.

FIG. 4 is a plot illustrating the hydrogen desorption curves of the hydrogen storage compositions containing the formulations A, B, C and D. The experiments of acquiring the hydrogen desorption curves are carried out in water (50° C.). Initially, hydrogen gas is discharged from the hydrogen storage container 3 at the hydrogen desorption rate of 8 liters/min. Until the hydrogen desorption rate is 0.5 liter/min, the discharge of hydrogen gas is stopped. The hydrogen desorption curves of the hydrogen storage compositions containing the formulations A, B, C and D are shown in FIG. 4. The hydrogen storage composition containing the formulation A can discharge hydrogen gas at the hydrogen desorption rate of 8 liters/min for 1300 seconds. The hydrogen storage composition containing the formulation B can discharge hydrogen gas at the hydrogen desorption rate of 8 liters/min for 2200 seconds. The hydrogen storage composition containing the formulation C can discharge hydrogen gas at the hydrogen desorption rate of 8 liters/min for 2900 seconds. The hydrogen storage composition containing the formulation D can discharge hydrogen gas at the hydrogen desorption rate of 8 liters/min for 3200 seconds. The results of the experiments demonstrate that the hydrogen desorption duration increases with the increasing amount of the thermally-conductive material. Since the thermally-conductive material has the needle-type structure, the thermal conduction efficacy of the hydrogen storage composition is enhanced. Under this circumstance, the efficiency of discharging hydrogen gas, the discharged amount of hydrogen gas and the hydrogen desorption duration increase. Since the thermally-conductive material, the hydrogen storage material and the elastic material of the hydrogen storage composition are directly mixed with each other, the hydrogen storage composition possesses the function of the aluminum boxes of the conventional technology. According to the present invention, the necking procedure is previously performed because it is not necessary to place the aluminum boxes into the canister body 30. When compared with the conventional technology, the process of pouring the hydrogen storage material into plural aluminum boxes, the process of placing the aluminum boxes into the canister body and the two thermally-treating processes are not required. Consequently, the method of producing the hydrogen storage container according to the present invention is time-saving and labor-saving.

From the above descriptions, the thermally-conductive material and the elastic material of the hydrogen storage composition are used for replacing the aluminum boxes of the conventional technology. The use of the thermally-conductive material can increase the thermal conduction efficacy of the hydrogen storage composition. Consequently, the discharged amount of hydrogen gas and the hydrogen desorption duration increase. Moreover, the addition of the elastic material can alleviate the deformation (or strain) that is resulted from the volume expansion or shrinkage of the hydrogen storage material. Since the deformation of the canister body is reduced, the durability and safety of the canister body are enhanced. Since the process of pouring the hydrogen storage material into plural aluminum boxes, the process of placing the aluminum boxes into the canister body and the two thermally-treating processes are not needed, the method of producing the hydrogen storage container according to the present invention is cost-effective, material-saving, labor-saving and time-saving. In other words, the hydrogen storage composition and the method for producing the hydrogen storage container according to the present invention are industrially valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for producing a hydrogen storage container, the method comprising steps of:
   (a) placing a hydrogen storage composition into a canister body, wherein the hydrogen storage composition comprises a thermally-conductive material, a hydrogen storage material and a granular elastic material configured to alleviate a deformation that is resulted from a volume expansion or shrinkage of the hydrogen storage material, wherein the hydrogen storage composition comprises 1 to 15 weight parts of thermally-conductive material and 1 to 35 weight parts of the granular elastic material, based on a total of 100 weight parts of the thermally-conductive material, the hydrogen storage material and the granular elastic material, wherein the hydrogen storage composition is prepared by steps of:
   mixing the thermally-conductive material and the granular elastic material in a pretreatment vessel;
   creating a vacuum environment within the pretreatment vessel; and
   adding the hydrogen storage material into the pretreatment vessel, so that the hydrogen storage composition is prepared
   (b) creating a vacuum environment within the canister body, and recording a first weight of the canister body;
   (c) activating and charging hydrogen gas into the canister body, and recording a second weight of the canister body; and
   (d) calculating a hydrogen storage amount according to the first weight and the second weight, and judging whether the hydrogen storage amount reaches a predetermined value, wherein if the hydrogen storage amount reaches the predetermined value, the hydrogen storage container is produced, wherein if the hydrogen storage amount does not reach the predetermined value, the steps (b), (c) and (d) are repeatedly done;
   wherein after the thermally-conductive material and the granular elastic material are mixed in the pretreatment vessel, the pretreatment vessel is sealed and placed in a water tank at 60° C. or higher, and a vacuum pump is used to create the vacuum environment within the pretreatment vessel.

2. The method according to claim 1, wherein the step of activating and charging hydrogen gas into the canister body is performed by placing the canister body in a hydrogen supply system with cold water circulation at 5~20° C. and charging pure hydrogen gas into the canister body for at least one hour.

3. The method according to claim 1, wherein the granular elastic material is an elastic resin, or a solid polymeric material selected from the group consisting of Polyurethanes, Rubbers, Elastomers, Polyvinyl chloride, Acrylonitrile-butadiene-styrene copolymer, High density polyethylene, Low density polyethylene, Polystyrene, Polycarbonate, Poly (methyl methacrylate), Thermoplastic elastomer and Polypropylene.

4. The method according to claim 1, wherein the granular elastic material includes a solid polymeric material having a plastic deformation rate higher than or equal to the deformation rate of the hydrogen storage material.

5. The method according to claim 1, wherein the thermally-conductive material is carbon, copper, titanium, zinc, iron, vanadium, chromium, manganese, cobalt, nickel or aluminum.

6. The method according to claim 1, wherein the thermally-conductive material has thermal conductivity in a range between 90 and 500 W/mk.

7. A method for producing a hydrogen storage container, the method comprising steps of:
(a) placing a hydrogen storage composition into a canister body, wherein the hydrogen storage composition comprises a thermally-conductive material, a hydrogen storage material and a granular elastic material configured to alleviate a deformation that is resulted from a volume expansion or shrinkage of the hydrogen storage material;
(b) creating a vacuum environment within the canister body, and recording a first weight of the canister body;
(c) activating and charging hydrogen gas into the canister body, and recording a second weight of the canister body; and
(d) calculating a hydrogen storage amount according to the first weight and the second weight, and judging whether the hydrogen storage amount reaches a predetermined value, wherein if the hydrogen storage amount reaches the predetermined value, the hydrogen storage container is produced, wherein if the hydrogen storage amount does not reach the predetermined value, the steps (b), (c) and (d) are repeatedly done;
wherein in the step (c), after the hydrogen storage composition is placed into a canister body, the canister body is sealed and placed in a water tank at 60° C. or higher, and a vacuum pump is used to create the vacuum environment within the canister body.

8. The method according to claim 7, wherein the granular elastic material is an elastic resin, or a solid polymeric material selected from the group consisting of Polyurethanes, Rubbers, Elastomers, Polyvinyl chloride, Acrylonitrile-butadiene-styrene copolymer, High density polyethylene, Low density polyethylene, Polystyrene, Polycarbonate, Poly (methyl methacrylate), Thermoplastic elastomer and Polypropylene.

9. The method according to claim 7, wherein the granular elastic material includes a solid polymeric material having a plastic deformation rate higher than or equal to the deformation rate of the hydrogen storage material.

10. The method according to claim 7, wherein the thermally-conductive material is carbon, copper, titanium, zinc, iron, vanadium, chromium, manganese, cobalt, nickel or aluminum.

11. The method according to claim 7, wherein the thermally-conductive material has thermal conductivity in a range between 90 and 500 W/mk.

12. The method according to claim 7, wherein the step of activating and charging hydrogen gas into the canister body is performed by placing the canister body in a hydrogen supply system with cold water circulation at 5~20° C. and charging pure hydrogen gas into the canister body for at least one hour.

* * * * *